July 4, 1933.                H. P. HESS                1,917,033
             COMBINATION HOT AND COLD WATER CONNECTION
                       Filed March 23, 1929

Howard P. Hess
*INVENTOR*

BY Charles A. Clark
*ATTORNEY*

Patented July 4, 1933

1,917,033

UNITED STATES PATENT OFFICE

HOWARD P. HESS, OF CHESTER, NEW YORK

COMBINATION HOT AND COLD WATER CONNECTION

Application filed March 23, 1929. Serial No. 349,357.

My invention relates to a combination faucet connection adapted to connect together hot and cold water supply pipes and deliver the water through a swivelled pipe.

One object of my invention is to provide a device adapted to connect hot and cold water pipes together, which device can be utilized and aligned with standard faucets.

Another object of my invention is to provide a simple, adjustable, effective means for spanning and connecting parallel service pipes with a common swivelled discharge pipe.

A further object of my invention is to provide an attachment whereby a pair of standard faucets can be connected to hot and cold water pipes and joined together by a combination spout and mixing chamber, which spout is swivelled to the attachment.

A still further object of my invention is to provide a device attachable to a plain faucet and a hose connection faucet that can be adjusted to line up with the faucets and hold a soap dish.

I attain these objects by the means illustrated in the accompanying drawing, wherein similar parts are referred to throughout the several views, in which:—

Figure 1:
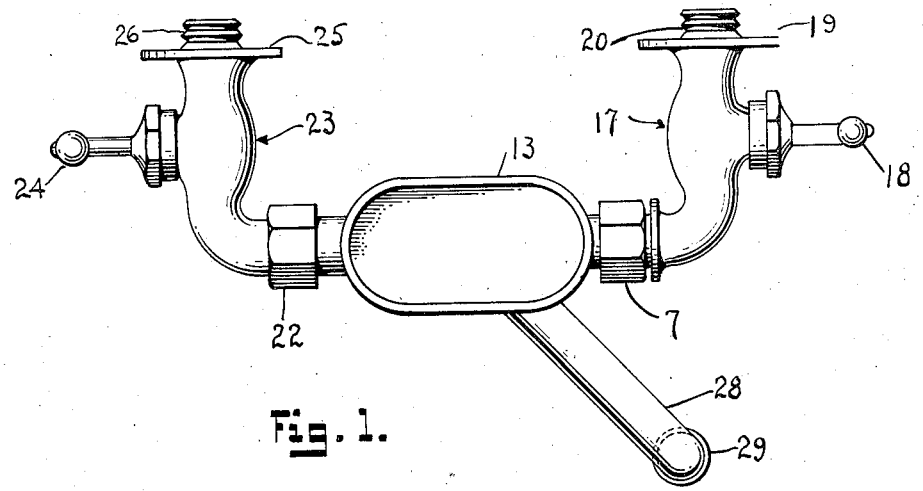
Figure 1 is a plan of the device.
Figure 2:
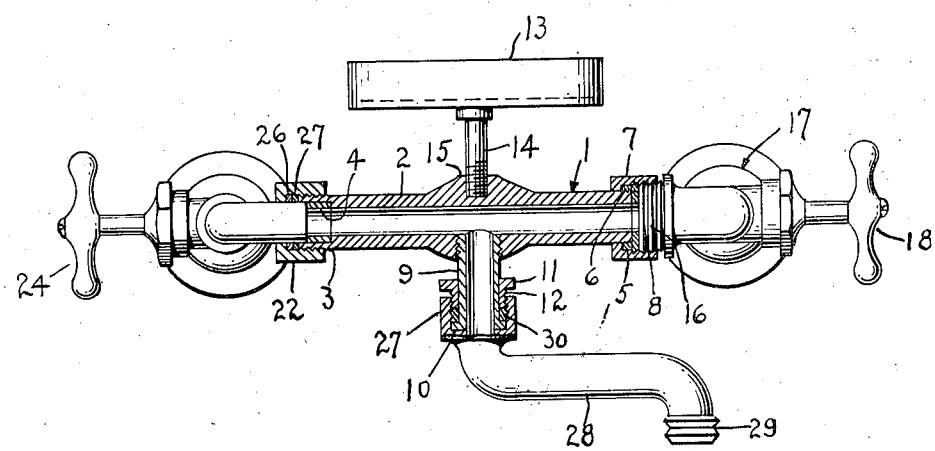
Figure 2 is a section of the device.

The device is comprised of a T shaped element 1 consisting of a pipe shaped body 2 with the threads 3 on one end and a counterbore 4.

On the other end is a shoulder 5 which consists of a ring threaded at 6 which ring engages with a swivelled nut 7 slidable upon the body 2 and having threads 8 on the inside.

The center of this body 2 is suitably formed to provide a means for holding the nipple 9 which is provided with a shoulder 10 and upon this nipple the sleeve 11, threaded at 12 is slidably held.

Directly opposite this nipple 9 the soap box or dish 13 is carried by a stud 14 which is threaded into the body 2 at 15.

The swivel nut 7 is screwed on the hose connection of the faucet 17 which is provided with the handle 18 for operating the valve of the faucet and the other end of this faucet has a flange 19 and a threaded end 20 for connecting to a water pipe, not shown and to prevent this element from leaking the washer 21 is utilized between the end of the faucet hose connection and the shoulder 5 of the body 2.

The threads 3 on the opposite end of the body 2 engage with a nut 22 having threads engaging with the threads 3 and slidable over the end of the plain faucet 23, as shown, which faucet has a handle 24 for operating its valve.

This faucet 23 has a flange 25 and threads 26 for attaching to a water pipe, not shown, and to prevent this faucet from leaking the brass washer 26 and rubber gasket 27 are utilized between the nut 22 and the end of the part 2.

The threads 12 on the sleeve 11 engage with the threads 27 in the swivel tubular arm 28 which is provided with a hose connection 29 and to prevent this connection from leaking, the gasket 30 is provided.

Having thus illustrated and described the preferred embodiment of my invention, I do not wish to limit myself to the exact construction or arrangement of parts shown, since it is evident that modifications may be made therein without departing from the spirit of the invention or scope of the claim.

I claim:—

A combination hot and cold water connection comprised of a pipe with threads and a counterbore at one end, a ring on the other end holding a swivelled nut, the center of said pipe provided with means for holding a swivelled tubular arm and a means for holding a soap dish, said threaded end provided with a nut co-operating with said counterbore to receive and hold the end of a plain bib and the swivelled nut on the other end of said pipe adapted to hold the end of a hose bib.

Signed at Chester in the county of Orange and State of New York, this 20th day of March, 1929.

HOWARD P. HESS.